April 21, 1942.  H. W. SRYGLEY  2,280,553
ATTACHMENT FOR SAFE KNOBS
Filed March 4, 1940  2 Sheets-Sheet 1

H. W. SRYGLEY INVENTOR.

BY
J. McAllister Stevenson
ATTORNEY.

April 21, 1942.  H. W. SRYGLEY  2,280,553
ATTACHMENT FOR SAFE KNOBS
Filed March 4, 1940  2 Sheets-Sheet 2

H. W. SRYGLEY INVENTOR.
BY J. McAllister Stevenson
ATTORNEY.

Patented Apr. 21, 1942

2,280,553

UNITED STATES PATENT OFFICE 2,280,553

ATTACHMENT FOR SAFE KNOBS

Harry W. Srygley, Abilene, Tex.

Application March 4, 1940, Serial No. 322,144

13 Claims. (Cl. 109—34)

My invention relates to devices suitable for attaching to a safe, and especially to the combination dial or knob thereof, which comprises some sort of protective device, preferably a frangible container of noxious gas, serving to protect the safe, and especially the combination mechanism thereof, from attack and damage.

The object of my invention is to provide a protective covering attachment which is self contained, requiring no alteration or adaptation of the safe and its fittings, which may be readily attached to and removed from the combination dial by proceeding in the authorized manner, which is neat, compact, portable, and may be laid away in safety when not in use, and which will be cause to operate the protective device contained therein, as by breaking the frangible container, whenever there is the slightest unauthorized tampering with my attachment after it shall have been attached in the authorized manner; and to that end my invention resides in the novel construction and arrangement of parts hereinafter described and particularly pointed out in the claims.

Referring now to the drawings, in which like characters indicate like parts:

Figure 1:
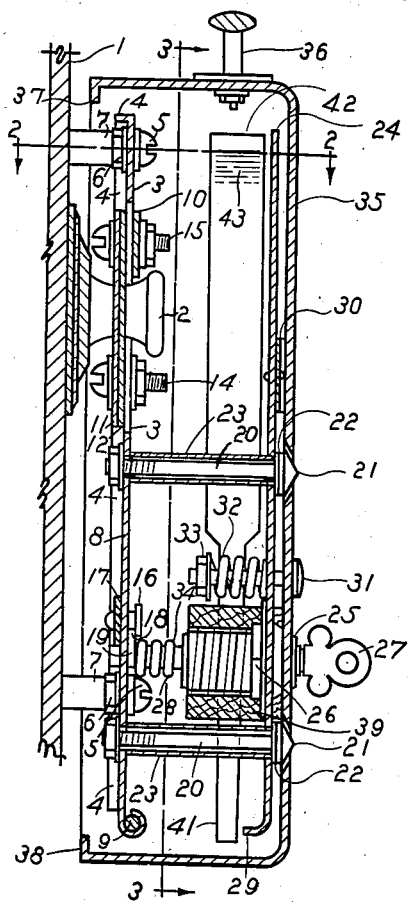
Fig. 1 is a view in side elevation of my device in closed position, taken in section on the line 1—1 of Fig. 2.
Figure 3:
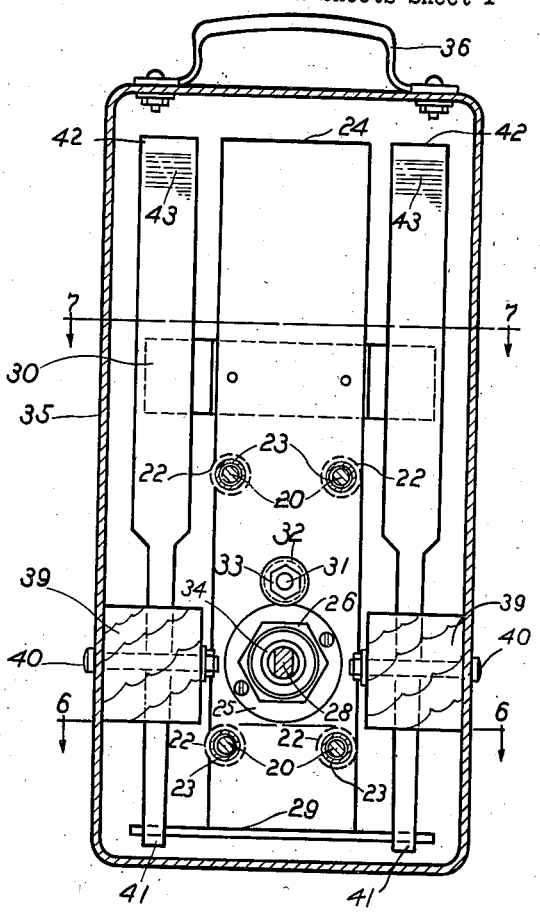
Fig. 3 is a rear elevation taken in section on line 3—3 of Fig. 1.
Figure 2:
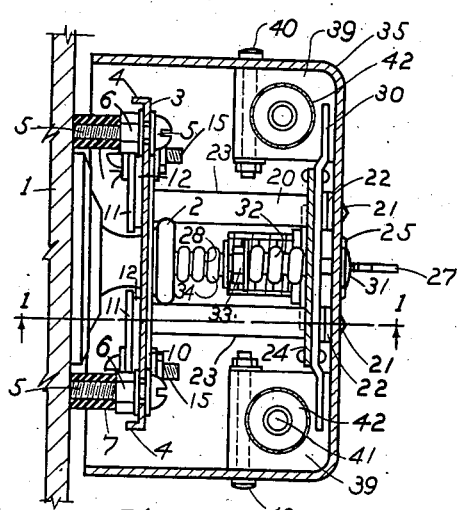
Fig. 2 is a plan view of the same, taken in section on the line 2—2 of Fig. 1.
Figure 4:
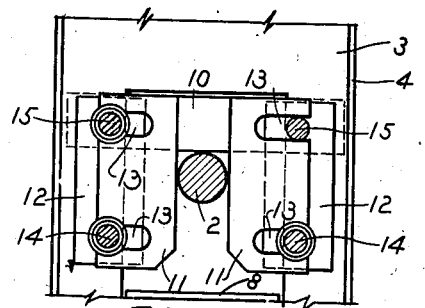
Fig. 4 is a rear elevation of part of the table 3 showing the jaws 11, 11.

Over the combination dial knob 2 in the safe door 1 I apply the table or base 3 of my device, the upper part of the knob 2 passing through an opening or cutout in the table 3. This table or base 3 is of sheet metal, and may have its edges bent over to form lips 4, 4 for further strength.

The table 3 is supported or held off from the vertical surface of the safe door 1 by legs made of stove bolts 5 secured by nuts 6 and shod with rubber shoes 7 which serve to hold the table 3 substantially even with the waist of the knob 2. At the lower end of the table 3 the swing plate 8 is connected to the table 3 by a hinge 9.

Above the knob 2 a cross bar 10 extends across the opening in the table 3 and rests on the outer surface thereof. On the inner surface of table 3 on each side of and extending toward the knob 2 I place jaws 11, 11, each having its lower corner cut off at an angle. Shims 12, 12 may be used as needed between table 3 and jaws 11, 11 and the latter have slotted holes 13, 13 permitting them to be set toward or from the knob 2, as may be required. Through table 3, shims 12, 12 and jaws 11, 11 at the bottom pass bolts 14 by which they are fastened, and through the same and cross bar 10 at the top pass bolts 15, 15 by which they are fastened. The holes in cross bar 10 are off center to permit adjustment by reversing it.

In applying the table 3 to the safe door 1 and knob 2 the cross bar 10 and jaws 11, 11 are first adjusted and set with reference to the nob 2, after which the table 3 and the whole attachment with it may be removed by sliding up so that the knob 2 will pass through the remainder of the cutout opening; likewise, by applying the table 3 over the knob 2 and sliding it down so that the jaws 11, 11 grip the knob 2, it and the device will again be fastened to the safe door 1. The upper end of swing plate 8 closes the opening below knob 2 when swung home so that the table 3 can not be removed until it is swung clear.

The swing plate 8 is widened at the bottom for the hinge 9 but otherwise is narrower than the distance between legs 5, 5. Through it is an opening to permit the passing of the keeper stud 16, which I have shown mounted on a cross bar 17 but may be mounted directly on the table 3. The keeper stud 16 has a slot 18 in the portion extending beyond the swing plate 8 to receive the latch 19.

Fastened to and extending outwardly from the swing plate 8 are four studs 20 spaced apart and terminating in heads 21 whose outer surface is conical. These studs 20 have washers 22 next to the heads, and then sleeves 23 which pass through holes in the press plate 24 so that it may slide toward and away from the swing plate 8.

Extending through the press plate 24 from the outer side, is a cylinder lock 25 fastened by a nut 26 and operable by a key 27. Its shaft 28 is surrounded by a spring 34 which presses apart the lock 25 and latch 19. The latter is slidable upon the shaft 28 and keyed thereto by a spline or squared portion. The end of shaft 28 is rounded, and is loosely and slidably journaled in the swing plate 8 and extends therebeyond through a hole or opening in the table 3.

It will thus be seen that the spring 34 presses the latch 19 against the swing plate 8 where by turning it can lock into the slot 18 in the keeper stud 16 thereby locking the swing plate 8 and all parts mounted thereon, to the table 3. And, further, that the outward pressure of the spring 34 holds the press plate 24 in normal position against the bolt heads 21 parallel to the swing plate 8 and that this relation will be maintained when the latch 19 is unlocked and the swing plate 8 swung away from the base or table 3.

The press plate 24 is of substantially the same vertical length as the table 3 and has at the bottom a widened portion with an inbent lip 29 and toward the top a cross bar 30, each of which serves as a breaker bar, as will be shown. Above the lock 25 the press plate 24 has a hole to receive the housing support stud 31 rigidly fastened to the front of the housing 35 and surrounded by a spring 32 which presses against the press plate 24 and against a lock nut 33 at the end of the stud 31.

The housing 35 is thus held by the spring 32 so that its front face is against the press plate 24 in normal position, and swings with the swing plate 8 and other parts mounted thereon. It has a cut out through which the key 27 may be applied to the lock 25 and holes for the bolt heads 21 permitting the tips to protrude, and countersunk to provide surfaces conforming to the outer surfaces of the bolts so that when the housing 35 is moved from normal position one surface will tend to slide on the other.

Figure 5:
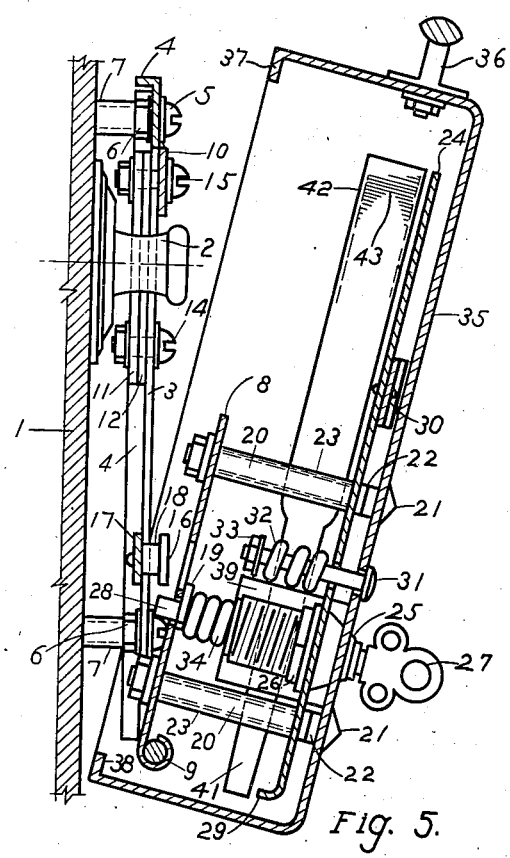
Fig. 5 is a view in side elevation of my device in open position taken on a central section.

The housing 35 is a rectangular box having the side towards the safe door 1 open whereby it serves as a cover for the device as a whole. At the top it has a handle 36 by which it may be carried. The upper surface or top may have, if desired, a downward bent lip 37 and the bottom an upward bent lip 38 as shown in Fig. 5, thereby forming trays that may catch and hold portions of the liquid 43 when same is scattered upon the breaking of the container 42. In each of the corners between the front and sides of the housing 35 I place for tube support a wooden block 39 held to the housing by a bolt 40 and having a vertical tapered bore to receive the tapered end 41 of the tube 42 filled with a liquid 43 and sealed. Between the tapered end 41 and the tube support 39, as more clearly shown in Fig. 8 in which the tube support 39 is shown in section, I place plastic 44 such as plaster of paris, sealing wax, or other suitable material to hold the tube end 41 rigid. The liquid 43 is such that upon release by breaking of the tube 42 a noxious gas will be formed, and it is possible to use a different liquid in each, either having such an effect, but both combining to form a more violent effect.

From the above it will be seen that pressure upon the lock 25 will move the press plate 24 inward and cause one or the other of the breaker bars, either the lip 29 or cross bar 30 to impinge upon either the lower or upper portion of a tube, 41 or 42, and effect the breakage. Likewise when the housing is slid, twisted or turned into distorted position it will carry with it the tubes 42 and bring one of them against a lip 29 or cross bar 30 and thus effect breakage of at least one.

Figure 8:
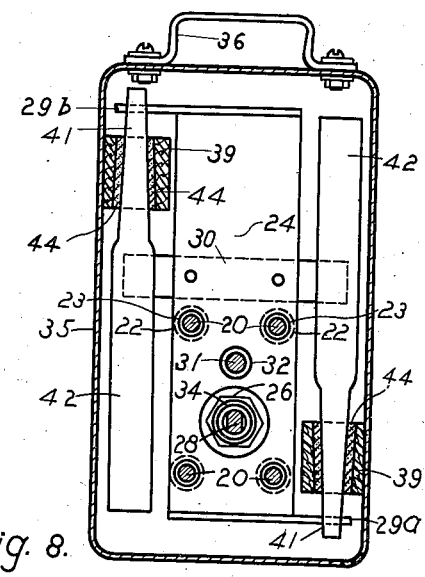
Fig. 8 is a view similar to Fig. 3 showing an alternative form in which one tube is inverted; and, Fig. 9 is a bottom view of an alternative form in which one tube is spaced further from the front, the bottom of the housing 35 being removed.
Figure 6:
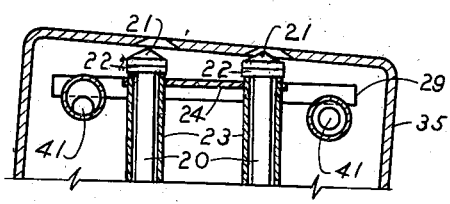
Fig. 6 is a plan view taken in section on the line 6—6 of Fig. 3, the housing 35 being shown in distorted position.
Figure 7:
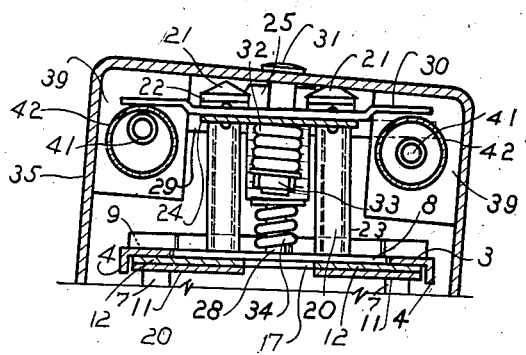
Fig. 7 is a similar plan view taken in section on the line 7—7 of Fig. 3.

In Fig. 8 I have shown an alternative form in which one tube support 39 is so disposed that the tube 42 held by it, is inverted. In this arrangement I provide a bottom lip 29a extending at one side, and a top lip 29b extending at the other, so that each will impinge upon the tube end 41 there located.

Figure 9:
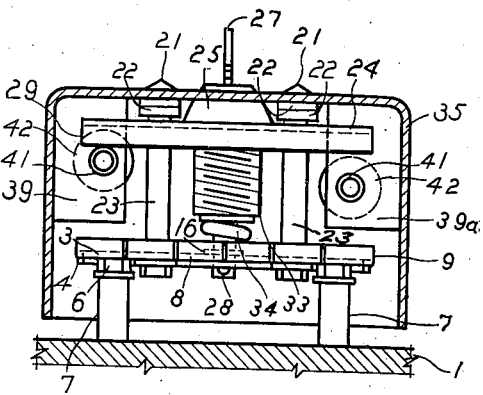

In Fig. 9 I show another modification in which a tube support 39a holds the tube at a greater distance from the front than does the support 39 from which it may result that one tube 42 would be broken by the press plate 24 being pushed back, leaving the other unbroken so that it might remain and serve as partial protection.

Ordinarily the safe door 1 will have a handle, not shown, so near to the combination knob 2 that my attachment will strike it and be prevented from being swung into inverted position. Should it be found that on safes where my attachment can be swung into inverted position breakage of the tube ends 41 could be effected, and tube bodies 42 left intact, so that the liquid would not spread or vaporize, then some such arrangement as I have shown in Fig. 8 and described above may become necessary.

The operation of my device has been explained in the foregoing description. When first installed the attachment is fitted to the safe door 1 and knob 2. It may then be removed each morning by unlocking the latch 19 permitting the swing plate 8, housing 35, and all parts contained between the two to be swung away from the table 3. An upward pull on the handle 36 causes the table 3 to slide upward so as to release the jaws 11 from the knob 2 and permit the whole device to be removed and stored during the day. Applying same at night downward pressure on the handle 36 brings the jaws 11 to engage the knob 2 and hold the table 3. Swinging the housing 35 to closed position brings the swing plate 8 to where it can be locked by the latch 19. After removal of the key 27, the device can not be opened and will resist attack as shown. Upon attack the tubes 42 should become broken before any damage is done to the other parts. The tube supports 39 can be removed, and new tube or tubes with supports inserted although the apparatus will be out of commission until such replacement is made.

What I claim as new, and desire to secure by Letters Patent of the United States, is:

1. A protective covering for safe combination dial pieces, consisting of a base having jaws partly surrounding the combination knob to grip same, a plate disposed on the base serving when in closed position to complete the surrounding of the knob, a housing mounted on the plate adapted to surround the base when in closed position, both plate and housing being movable together to open position at which the jaws may be withdrawn from the knob, a protective device within the housing, and means for locking the plate and housing to the base.

2. A protective covering for safe combination dial pieces, consisting of a slidable base having jaws to grip the combination knob, a plate disposed on the base and limiting the sliding thereof when in closed position, a housing adapted to surround the base when in closed position mounted on the plate by connecting means disposed within the housing, both plate and housing being movable together to open position at which the jaws may be withdrawn from the knob, a protective device within the housing, and means for locking the plate to the base.

3. A protective covering for safe combination dial pieces, consisting of a slidable base having jaws to grip the combination knob, a swing plate hinged to the base and limiting the sliding thereof when in closed position, a housing adapted to surround the base when in closed position mounted on the swing plate by connecting means disposed within the housing whereby it may be swung open to permit the sliding of the base and removal thereof from the knob, a protective device within the housing, and means operable from without for locking the swing plate to the base.

4. A protective covering for safe combination dial pieces, consisting of a slidable base having jaws to grip the combination knob, a swing plate hinged to the base and limiting the sliding thereof when in closed position, a press plate mounted upon members attached to said swing plate to permit motion toward and from same, yielding means tending to hold the press plate away from the swing plate, a housing to cover the base when in closed position, means upon the press plate for supporting the housing and permitting relative movement thereof, one or more frangible containers for noxious gas on the housing, impact members on the press plate operable by such relative movement to break the containers, yielding means tending to hold the housing in normal position, and means operable from without the housing to lock the swing plate to the base.

5. A protective covering for safe combination dial pieces, consisting of a slidable base having jaws to grip the combination knob, a swing plate hinged to the base and limiting the sliding thereof when in closed position, a press plate mounted upon members attached to said swing plate to permit motion toward and from the same, a lock mounted on the press plate having a shaft extending through and loosely journaled in the swing plate, a keeper on the base extending through the swing plate, a latch slidable on the lock shaft to engage the keeper, yielding means tending to hold the latch to the keeper and the press plate away from the swing plate, a housing to cover the base but permitting access to the lock, means upon the press plate for supporting the housing and permitting relative movement thereof, one or more frangible containers for noxious gas on the housing, impact members on the press plate operable by such relative movement to break the containers, and yielding means mounted on the press plate tending to hold the housing in normal position.

6. In a device of the class described, a base having jaws partly surrounding the combination knob, a plate disposed on the base serving when in closed position to complete the enclosing of the knob, a press plate mounted upon members attached to said first plate to permit motion toward and from the same, a lock mounted on the press plate having a shaft extending through and loosely journaled in the first plate, a keeper on the base extending beyond the first plate, a latch slidable on the lock shaft to engage the keeper, a spring upon the lock shaft pressing the latch toward the keeper, a housing to cover the base but permitting access to the lock, and means upon the press plate for supporting the housing and permitting relative movement thereof.

7. In a device of the class described, a slidable base having jaws to grip the combination knob, a swing plate hinged to the base and limiting the sliding thereof when in closed position, a press plate mounted upon members attached to said swing plate to permit motion toward and from same, a lock mounted on the press plate having a shaft extending through and loosely journaled in the swing plate, a keeper on the base extending beyond the swing plate, a latch slidable on the lock shaft to engage the keeper, a spring upon the lock shaft pressing the latch toward the keeper, a housing to cover the base but permitting access to the lock, and means upon the press plate for supporting the housing and permitting relative movement thereof.

8. In a device of the class described, a base, means for fastening the base to the safe knob, a plate having a plurality of bolts fastened and disposed normal thereto, means for fastening the plate to the base, a second plate slidable on said bolts, the heads of said bolts limiting the outward movement of the second plate having a tapered outer surface, spring means tending to hold the second plate outward, a housing to surround the base provided with tapered inner surfaces conforming to each bolt head whereby it will ride on the bolt heads when moved from normal position, means on the second plate for supporting the housing but permitting relative movement thereof, and means cooperating with said last named means and tending to hold the housing in normal position.

9. A protective covering for safe combination dial pieces, consisting of a base locked to the knob, a housing to cover the base, means for locking the housing to the base, supporting means for the housing permitting relative movement thereof disposed within same and connected to the base, said supporting means and housing having a protective device on one and an impact member on the other, the protective device being disposed in the path taken by the impact member during such relative movement so as to be set off by impact therewith, and yielding means tending to hold the housing in normal position.

10. A protective covering for safe combination dial pieces, consisting of a base surrounding the knob, a housing to cover the base, means operable from without serving to lock the housing to the base and the base to the knob, supporting means for the housing permitting relative movement thereof disposed within same and connected to the base, said supporting means and housing having a protective device on one and an impact member on the other, the protective device being disposed in the path taken by the impact member during such relative movement so as to be set off by impact therewith, and yielding means tending to hold the housing in normal position.

11. A protective covering for safe combination dial pieces, consisting of a base locked to the knob, a housing to cover the base, means for locking the housing to the base, supporting means for the housing permitting relative movement thereof disposed within same and connected to the base, a frangible container for noxious gas on one, and an impact member on the other, the container being disposed in the path taken by the impact member during such relative movement so as to be broken by impact therewith and yielding means tending to hold the housing in normal position.

12. A protective covering for safe combination dial pieces, consisting of a base surrounding the knob, a housing to cover the base, means operable from without serving to lock the housing to the base and the base to the knob, supporting means for the housing permitting relative movement thereof disposed within same and connected to the base, a frangible container for noxious gas on one, and an impact member on the other, the container being disposed in the path taken by the impact member during such relative movement so as to be broken by impact therewith, and yielding means tending to hold the housing in normal position.

13. A protective covering for safe combination dial pieces, consisting of a slidable base having jaws to grip the combination knob, a swing plate hinged to the base and limiting the sliding thereof when in closed position, a housing to cover the base when in closed position, supporting means for the housing permitting relative movement thereof disposed within same and mounted upon the swing plate, a frangible container for noxious gas on one, and an impact member on the other, the container being disposed in the path taken by the impact member during such relative movement so as to be broken by impact therewith, yielding means tending to hold the housing in normal position, and means operable from without the housing to lock the swing plate to the base.

HARRY W. SRYGLEY.